United States Patent
Chavis et al.

(10) Patent No.: US 7,672,997 B2
(45) Date of Patent: Mar. 2, 2010

(54) SPEAKER ANNOTATION OBJECTS IN A PRESENTATION GRAPHICS APPLICATION

(75) Inventors: Ira L. Chavis, Wappingers Falls, NY (US); Lynn G. Winkelbauer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1871 days.

(21) Appl. No.: 10/706,372

(22) Filed: Nov. 12, 2003

(65) Prior Publication Data

US 2005/0102360 A1 May 12, 2005

(51) Int. Cl.
*G06F 13/00* (2006.01)
(52) U.S. Cl. .......................... 709/205; 709/206; 719/328
(58) Field of Classification Search .................. 709/204, 709/205, 206, 207, 217, 219; 719/328, 329
See application file for complete search history.

(56) References Cited

U.S. PATENT DOCUMENTS

| | | | |
|---|---|---|---|
| 4,715,818 A | 12/1987 | Shapiro et al. ............... | 434/118 |
| 4,876,657 A | 10/1989 | Saito et al. .................. | 364/521 |
| 5,107,443 A | 4/1992 | Smith et al. .................. | 395/158 |
| 5,124,693 A * | 6/1992 | Himelstein et al. .......... | 345/427 |
| 5,339,389 A | 8/1994 | Bates et al. .................. | 395/153 |
| 5,539,658 A | 7/1996 | McCullough et al. ....... | 364/514 |
| 5,581,702 A | 12/1996 | McArdle et al. ....... | 395/200.04 |
| 5,634,018 A | 5/1997 | Tanikoshi et al. ........... | 395/329 |
| 5,721,852 A | 2/1998 | Porter ......................... | 395/349 |
| 5,790,114 A * | 8/1998 | Geaghan et al. ............. | 715/763 |
| 5,857,189 A * | 1/1999 | Riddle .......................... | 707/10 |
| 5,859,974 A | 1/1999 | McArdle et al. ....... | 395/200.34 |
| 5,892,509 A | 4/1999 | Jakobs et al. ................ | 345/331 |
| 5,917,480 A | 6/1999 | Tafoya et al. ................ | 345/302 |
| 5,944,785 A | 8/1999 | Pommier et al. ............ | 709/205 |
| 5,995,096 A | 11/1999 | Kitahara et al. ............. | 345/330 |
| 6,037,943 A | 3/2000 | Crone et al. ................. | 345/357 |
| 6,091,408 A | 7/2000 | Treibitz et al. .............. | 345/329 |
| 6,178,431 B1 | 1/2001 | Douglas ...................... | 707/512 |
| 6,178,432 B1 * | 1/2001 | Cook et al. .................. | 715/201 |
| 6,308,199 B1 | 10/2001 | Katsurabayashi ........... | 709/204 |
| 6,324,553 B1 | 11/2001 | Cragun et al. ............... | 707/513 |
| 6,546,406 B1 * | 4/2003 | DeRose et al. .............. | 715/234 |
| 7,162,528 B1 * | 1/2007 | Simonoff et al. ............ | 709/229 |

OTHER PUBLICATIONS

Intel 82830M Graphics Controller, Multi-Monitor: Understanding Options For Multiple Displays, 5 pages from http://support.intel.com/support/graphics/intel830m/tti011.htm.

* cited by examiner

*Primary Examiner*—Viet Vu
(74) *Attorney, Agent, or Firm*—William A. Kinnaman, Jr.

(57) ABSTRACT

A method, system, and program product for controlling the content displayed during a computer driven presentation of a presentation graphics application. Hidden object presentation properties are assigned to presentation graphics objects during creation of a presentation graphics file, the properties controlling the circumstances under which hidden objects are displayed during a computer driven presentation or screenshow. One type of hidden object presentation property indicates whether an object is viewable on an audience display and presenter display, or only a presenter display, during a multi-display screenshow. Another type of hidden object presentation property, such as hidden object value, determines the audience to which the object is displayed. Hidden object value properties may be hierarchical, individually selectable in any combination, or mutually exclusive. During screenshow setup, one or more display attributes are assigned to each logical display to be used in the screenshow, the display attributes determining the objects viewable thereon.

35 Claims, 12 Drawing Sheets

SPEAKER ANNOTATION OBJECTS IN A PRESENTATION GRAPHICS APPLICATION

CROSS REFERENCE TO RELATED APPLICATIONS

This application contains subject matter which is related to the subject matter of the following application, which is assigned to the same assignee as this application and is hereby incorporated herein by reference in its entirety: "MULTI-VALUE HIDDEN OBJECT PROPERTIES IN A PRESENTATION GRAPHICS APPLICATION," by Chavis et al., Ser. No. 10/706,374, co-filed herewith, now abandoned.

FIELD OF THE INVENTION

The present invention relates in general to presentation graphics applications. In particular, the present invention relates to controlling the content displayed during a computer driven presentation of a presentation graphics application.

BACKGROUND

Presentation graphics software applications are well known in the art. In general, presentation graphics applications allow a user to arrange presentation graphics objects (i.e., text, charts, graphics, etc., hereinafter "objects") onto a series of pages or presentation slides, edit and rearrange the objects within a page, add and delete pages, reorder pages, and save the resulting presentation in a file. The resulting presentation may be printed or otherwise converted to physical presentation media, such as transparencies or 35 mm slides, for example.

Modern presentation graphics software applications typically provide an alternative to physical presentation media. The alternative involves delivering the presentation directly to a display device attached to a computer system. Such a computer driven presentation, often termed a "slide show" or "screen show," provides an alternative to delivering a presentation using physical presentation media. As used herein, the terms "computer driven presentation," "slideshow," and "screenshow" are interchangeable. A computer driven presentation is delivered by a computer system running the presentation graphics application used to create the presentation. Alternatively, presentation graphics applications typically provide a user with the ability to prepare a presentation for delivery by a computer system on which the presentation graphics application is not installed.

Presentation graphics applications supporting a computer driven presentation option typically provide a degree of user control during two operations: presentation creation, and slide show setup. While creating a presentation, a user may assign various properties to presentation graphics objects: these properties are referred to herein as object properties. Some object properties, referred to herein as object presentation properties, involve aspects of how the object is presented during a slide show, such as: whether the object appears when the page first appears or upon the occurrence of some event (i.e., a user input or the passage of a user-specified time period), "animation" effects controlling the way in which the object is introduced during a slide show (i.e., the object may just appear, or it may slide in from the right, down from the top, etc.), sounds associated with the introduction of an object, actions to be taken when an object is "clicked" or "moused over" during a slide show, etc. During slide show setup, a user may select various options controlling aspects of a slide show presentation. For example, user selectable options may include: various visual effects controlling how new pages are introduced, whether new pages are introduced manually or after a specified period of time, whether sounds are associated with the introduction of new pages, the pages to be shown, whether presentation controls are displayed, etc.

Once a user creates a presentation, selects object properties, and selects slide show options, a user saves the presentation in a file. If another version of the presentation is needed, such as for a presentation to a different audience, a user modifies the presentation by changing, rearranging, adding, or deleting objects; changing, rearranging, adding, or deleting pages; modifying object properties and slide show options, etc., then saving the modified presentation in a new file. Thus, if a user wishes to create two presentations containing pages that are substantially similar but differ in some respects (such as differences in the objects appearing on each page), two files are likely needed if both presentations are to be retained with all content, properties, and settings intact.

Presentation graphics objects may be associated with a presentation page by being placed on or within the page, or by other means. For example, presentation graphics applications often provide an opportunity for a user to associate objects such as text or notes with each page of a presentation. These notes, often called speaker notes or simply notes, are typically intended for the presenter rather than the audience. Speaker notes are typically entered in a window or screen region which is separate from the presentation page with which the notes are associated. Speaker notes are, therefore, an example of a presentation graphics object that is associated with a presentation page, but which does not appear on or within the page. Speaker notes may be viewed in a variety of ways. For example, a user may view speaker notes while creating or editing a presentation. Presentation graphics applications often provide the ability to print speaker notes along with the presentation page associated with the notes, for use by a presenter in rehearsing or delivering a presentation.

Modern personal computers, both portable and desktop models, typically support multiple physical display devices. For example, a portable or laptop computer typically includes a permanently attached display, such as an LCD display, often integrated into the laptop cover. Laptop computers further typically include support for an external monitor or projector, which may be used instead of or in addition to the laptop monitor. Furthermore, as DVD drives become more commonly available in laptops, support for television monitors has become more common as well, often provided via an additional physical connector, such as an S-video output. Desktop computer systems typically provide support for a computer monitor, and may also provide support for multiple computer monitors, and may further provide support for a television monitor through an S-video or other output. Hardware support for the plurality of monitors may be provided by a plurality of hardware controllers or adapters, often one adapter per monitor. Alternatively, a single graphics controller may be capable of emulating multiple different controllers and providing multiple outputs at once, providing support for multiple physical display devices with a single hardware graphics controller.

Multiple physical display devices may be treated as a single logical display, or multiple logical displays. When treated as a single logical display, the multiple display devices each display the same content. When treated as multiple logical displays, however, different content may be displayed on each physical device. Operating systems such as MICROSOFT WINDOWS 98 and subsequent versions provide support for multiple monitors, allowing a user to define two logical displays, and various characteristics of each display, such as the resolution and relative logical locations of the two displays.

In order to advantageously use multiple logical displays, a method is employed to determine the content shown on each logical display. Methods are known in the art that involve mapping objects to an intermediate attribute, and then determining the content of each display based upon the intermediate attribute. Specifically, methods involving intermediate attributes such as screen or window, screen or window region, color, page, etc., are known in the art. For instance, a method using a window intermediate attribute displays one set of windows on one logical display, and another set of windows on a second logical display. On each logical display, all objects within displayed windows are displayed, no objects are displayed from non-displayed windows. Also for instance, a method using color as an intermediate attribute displays objects of one set of colors on one logical display, and objects of another set of colors on a second logical display. In this manner, all objects of the same color are shown on the same set of logical displays. Methods involving page or screen region operate in a similar fashion: one set of pages or screen regions is displayed on one logical display, and another set of pages or screen regions are displayed on another logical display. All objects within the same page or screen region are displayed on the same set of logical displays. For example, methods of determining the content of multiple logical displays involving a screen or window intermediate attribute are illustrated in the following U.S. patents: "ELECTRONIC PRESENTATION SYSTEM USING PORTABLE STORAGE MEDIA," by McCullough, U.S. Pat. No. 5,539,658, issued Jul. 23, 1996; "PRESENTATION SUPPORTING METHOD AND APPARATUS THEREFORE," by Tanikoshi et al., U.S. Pat. No. 5,634,018, issued May 27, 1997; "REMOTE COLLABORATION SYSTEM PERFORMED BY A HOST COMPUTER RUNNING AN APPLICATION PROGRAM AND REMOTE COMPUTERS RUNNING A PROGRAM DISTINCT FROM THE APPLICATION PROGRAM," by Pommier et al., U.S. Pat. No. 5,944,785, issued Aug. 31, 1999; "COOPERATIVE WORK SUPPORT SYSTEM FOR MANAGING A WINDOW DISPLAY," by Katsurabayashi, U.S. Pat. No. 6,308,199, issued Oct. 23, 2001. Methods of determining the content of multiple logical displays involving a page intermediate attribute are illustrated in the following United States Patents: "COMPUTER CONFERENCING SYSTEM FOR SELECTIVELY LINKING AND UNLINKING PRIVATE PAGE WITH PUBLIC PAGE BY SELECTIVELY ACTIVATING LINKED MODE AND NON-LINKED MODE FOR EACH PARTICIPANT," by McArdle et al., U.S. Pat. No. 5,581,702, issued Dec. 3, 1996; "METHOD OF APPARATUS FOR DISPLAYING A SPLIT BAR WINDOW," by Porter, U.S. Pat. No. 5,721,852, issued Feb. 24, 1998; and "APPARATUS AND METHOD FOR LINKING PUBLIC AND PRIVATE PAGES IN A CONFERENCING SYSTEM," by McArdle et al., U.S. Pat. No. 5,859,974, issued Jan. 12, 1999. Methods of determining the content of multiple logical displays involving a screen or window region intermediate attribute are illustrated in the following U.S. patent: "PRIVATE REGIONS WITHIN A SHARED WORKSPACE," by Smith et al., U.S. Pat. No. 5,107,443, issued Apr. 21, 1992.

A further example of mapping objects to an intermediate attribute, and then determining the content of each display based upon the intermediate attribute, involves displaying a presentation to an audience while displaying additional information, shown in different windows or different window regions, to the presenter. For example, a presentation graphics application sold under the name MICROSOFT POWERPOINT provides support for multiple monitors when used in an operating system environment also having multiple monitor support. The MICROSOFT POWERPOINT presentation graphics application allows a user to establish an audience screen where the presentation is displayed, and a presenter screen where the presentation plus additional information, such as speaker notes and other information, are displayed. All of the additional information displayed on the presenter display is mapped to screen or window regions outside of the presentation pages. Thus, the screen or window region representing the presentation page is shown on both displays, while additional information outside of this region is displayed only on the presenter display.

For the foregoing reasons, therefore, there is a need in the art for a method of determining the content presented on a plurality of logical displays, without mapping presentation objects to an intermediate attribute.

SUMMARY

The shortcomings of the prior art are overcome, and additional advantages realized, through the provision of methods of assigning properties to objects, and further through the provision of methods of determining the content displayed during a computer driven presentation based upon the assigned object properties.

In one aspect, the present invention involves a method of assigning hidden object presentation properties to objects within a presentation graphics application, by providing at least one user-selectable hidden object presentation property for a selected object, the object being within a presentation page, the at least one hidden object presentation property indicating at least one display attribute for which the selected object is presented during a computer-driven presentation, the computer-driven presentation being deliverable on a plurality of logical displays, and by associating a selected hidden object presentation property with the selected object in response to a user selection.

In another aspect, the present invention involves a method of displaying a computer-driven presentation on a plurality of logical displays, by providing at least one user-selectable display attribute for each of the plurality of logical displays, the at least one display attribute indicating hidden object properties of objects to be presented on each logical display during the computer-driven presentation, the objects being within presentation pages, by assigning one of said at least one display attribute to each of said plurality of logical displays in response to a user selection, and by presenting, on each of the plurality of logical displays, all objects associated with hidden object presentation properties indicated by the at least one display attribute assigned to each of the plurality of logical displays.

System and computer program products corresponding to the above-summarized methods are also described and claimed herein.

It is therefore an object of the present invention to provide a method for determining the content presented on a plurality of logical displays, without mapping presentation objects to an intermediate attribute.

It is a further object of the present invention to provide a method of assigning user-selectable properties to presentation graphics objects, where the properties are indicative of the intended viewers of the object.

It is a further object of the present invention to provide user-selectable display attributes assignable to a plurality of logical displays during setup of a computer-driven presentation, where the display attributes are indicative of the audience viewing the display, and the display attributes determine the objects viewable by the audience on the display during a computer-driven presentation.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

In accordance with preferred embodiments of the present invention, methods of assigning properties to objects, and methods of determining the content displayed during a computer driven presentation based upon the assigned object properties are disclosed herein.

Figure 1:
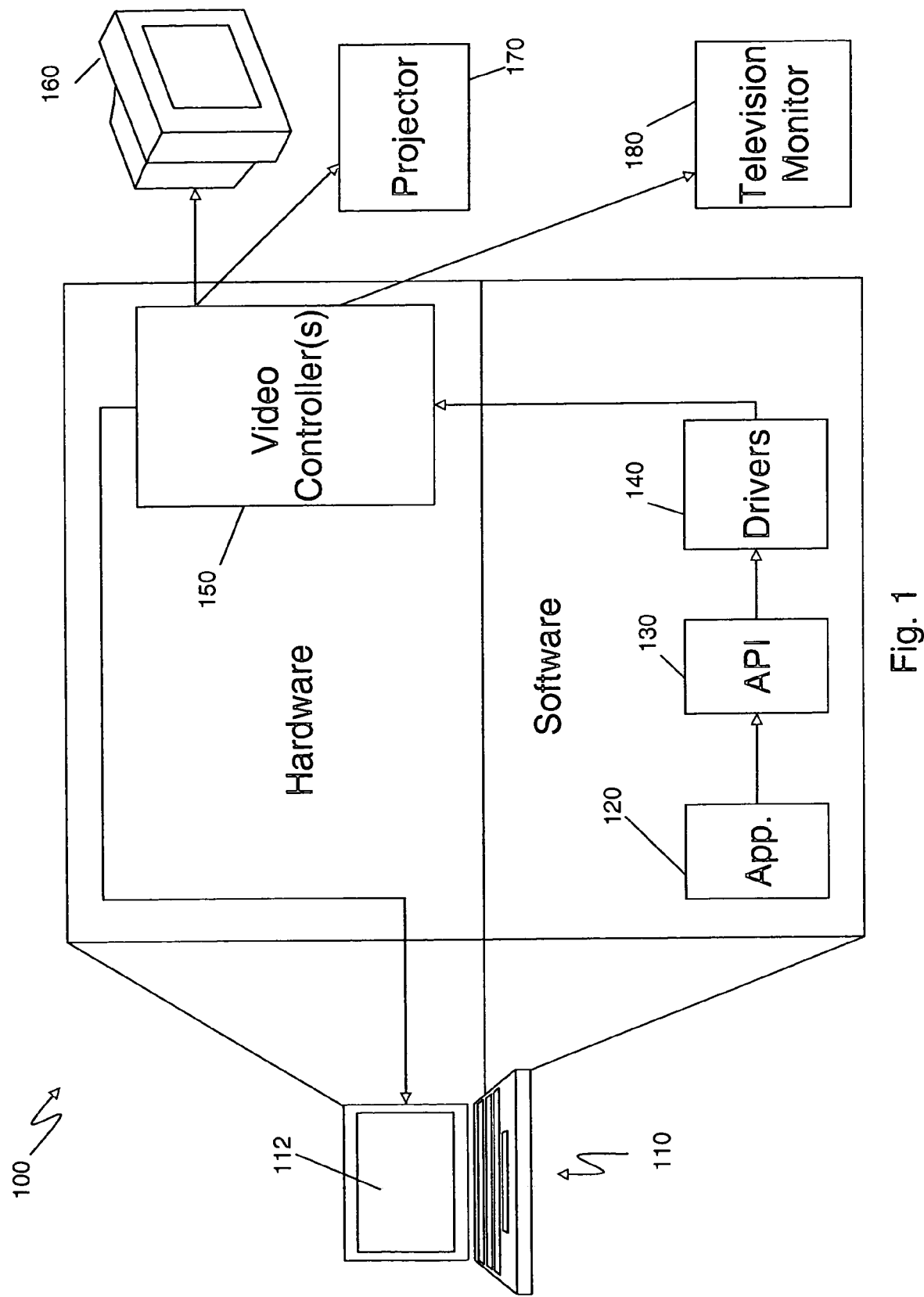
FIG. 1 illustrates a computing environment per an embodiment of the present invention.

FIG. 1 illustrates a computing environment in which the teachings of the present invention may be advantageously utilized. The computing environment of FIG. 1 is exemplary only; other computing environments are envisioned within the spirit and scope of the present invention. Computing environment 100 includes, for example, a laptop or portable computer 110, as known in the art. Alternatively, other computing devices may be substituted for computer 110, such as a desktop computer or other server system, or a personal digital assistant (PDA). In preferred embodiments of the present invention, laptop computer 110 is any portable computer capable of running a presentation graphics application program, such as a portable computer using an INTEL brand microprocessor (marketed by Intel of Santa Clara, Calif.) and running an operating system such as MICROSOFT WINDOWS (marketed by Microsoft of Redmond, Wash.), or LINUX. In preferred embodiments of the present invention in which different content is displayed on two or more logical displays, an operating system providing support for multiple logical displays is required, such as MICROSOFT WINDOWS 98 or any later version.

Laptop 110 includes standard hardware components as known in the art, such as a central processor, memory, non-volatile storage such as a hard disk drive (HDD), keyboard, pointing device, etc., interconnected by an internal bus structure. Standard hardware components such as these are not illustrated in FIG. 1, for simplicity. Laptop 110 includes a display 112, such as an LCD type display, which is typically integrated into the laptop cover. Laptop 110 further includes one or more video controllers 150, supporting various display devices such as an external computer monitor 160 or a projection device 170, or a television monitor 180. In preferred embodiments of the present invention, laptop 110 includes a single video controller 150 having multiple outputs and being capable of emulating and simultaneously supporting multiple display types. Such multiple output controllers are known in the art, and typically include a single embedded controller with separately addressable memory regions to support multiple logical displays, thereby enabling a user to display different content on each supported logical display. One example of a single graphics controller capable of supporting multiple logical displays is a controller sold under the name INTEL 82830M (or 830M) Graphics Controller (marketed by Intel of Santa Clara, Calif.). Alternatively, laptop 110 may include multiple video controllers 150, one controller 150 for each supported display type.

Laptop 110 provides a platform on which software components such as application 120 operate. Application 120 is a presentation graphics application per an embodiment of the present invention. Application 120 interfaces with a set of application programming interfaces (APIs) 130. API 130 provides application 120 with functions in support of multiple logical displays. API 130 may be included in an operating system, such as MICROSOFT WINDOWS 98 (or subsequent versions of MICROSOFT WINDOWS), or similar operating systems providing support for multiple logical monitors. API 130 in turn interfaces with one or more software drivers 140, which provide instructions and data to video controller(s) 150.

FIG. 2 illustrates a method of assigning hidden object presentation properties, per an embodiment of the present invention. As used herein, a hidden object presentation property is an object presentation property that indicates the audience (or logical display) attributes for which the object is displayed during a computer-driven presentation. Also, as used herein the term "hidden object" refers to any object with which a hidden object presentation property is associated, where the object presentation property indicates that the object is viewable under some but not all circumstances. Preferred embodiments of the present invention include multiple types of hidden object presentation properties, which may be advantageously used individually or collectively. For example, one type of hidden object presentation property is "presenter only." When delivering a computer-driven presentation with multiple logical displays, one display may be assigned an attribute such as "presenter" or "show speaker notes" or the like. During such a computer-driven presentation, objects assigned the property "presenter only" are visible only on logical displays assigned the attribute "presenter" or "show speaker notes" or the like. In this manner, a user is provided the capability to place, within the presentation page, objects that are viewable only by a presenter, without having to distinguish these "speaker annotation" objects by placing them in a specific window, screen, window or screen region, or page, or by limiting the speaker annotation objects to specific colors, or by mapping the speaker annotation objects to any other intermediate attribute. A user may thus place speaker annotation objects, such as explanatory text and graphics, directly on the presentation page, and view the speaker annotation objects during a computer-driven presentation without allowing the audience to view the speaker annotation objects.

As a further example, another type of hidden object presentation property is "hidden object value, or in preferred embodiments, "hidden object level." Such a property as hidden object value provides a user with the ability to place objects on a presentation page or otherwise associate objects with a presentation page, and designate the audience or display attributes for which the object is presented during a computer-driven presentation. For example, an embodiment of the present invention includes a hierarchical, three level object presentation property. In this embodiment, an object with which no hidden object presentation property is assigned (i.e., one that is always visible) is considered level 0. A level 1 hidden object property is assigned to objects viewable by a subset of all audiences. A level 2 property is assigned to objects viewable only by a more restrictive subset of audiences, and a level 3 property is assigned to objects viewable only by a further restricted subset of audiences. During setup of a computer-driven presentation, an audience or display attribute is selected, indicating the hidden object level(s) displayable to the audience. In this embodiment, selecting a level 1 display attribute presents only objects associated with a level 1 property or lower (i.e., level 0 or objects that are always viewable). Selecting a level 2 display attribute presents only objects associated with a level 2 property or lower: in this manner, level 2 objects, level 1 objects, and always viewable (level 0 objects) are presented. Finally, selecting a level 3 display attribute presents all objects. While a preferred embodiment of the present invention includes three levels of hidden objects, more or fewer levels are envisioned within the spirit and scope of the present invention. Alternative embodiments are also envisioned in which hidden object property values operate other than hierarchically. In such an embodiment, a user selects all hidden object property values to be associated with an object. The object is presented whenever any corresponding display attribute is selected during the setup of a computer-driven presentation. A further alternative is envisioned wherein hidden object property values are mutually exclusive.

Object properties such as "presenter only" and "hidden object value" may be used individually as previously described, or together as described herein. For example, in one embodiment of the present invention, a hidden object level attribute is independently selectable for each logical display used during a computer-driven presentation. In this manner, for example, one logical display is assigned a set of attributes such as "audience" and "level 2" while another logical display is assigned a different set of attributes such as "presenter" and "level 3." In this example, the display to which the "presenter" attribute is assigned presents two categories of objects in addition to the objects presented on the display to which the "audience" attribute is assigned: speaker annotations, and level 3 objects.

As previously noted, the term "hidden object" refers to any object with which a hidden object presentation property is associated, where the object presentation property indicates that the object is viewable under some but not all circumstances. For instance, in the illustrative examples previously provided herein, a hidden object is any object to which any of the following hidden object presentation properties are assigned: presenter only, level 1, level 2, level 3.

Figure 2A:
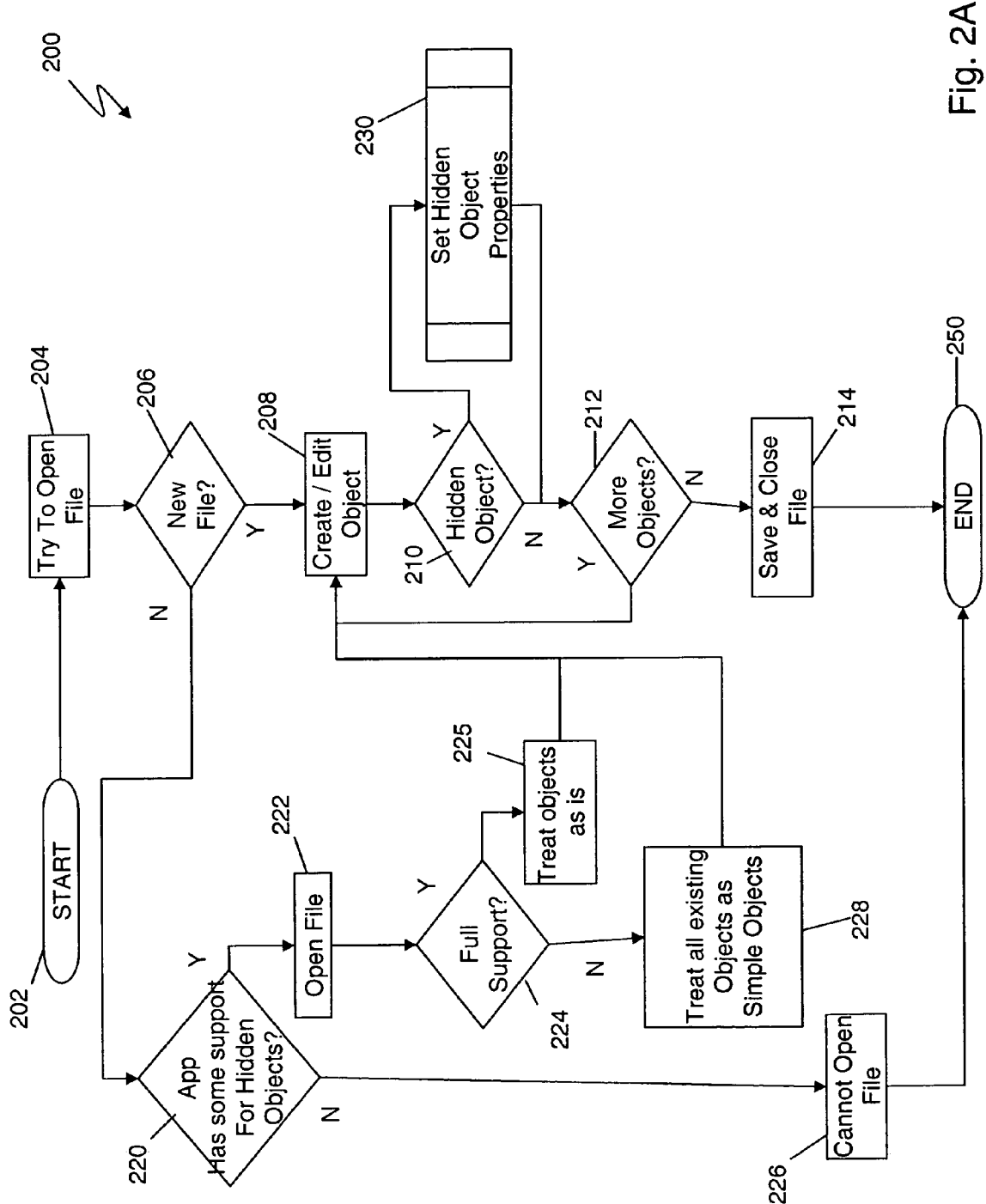
FIG. 2A illustrates a method of assigning object properties, per an embodiment of the present invention.

Method 200 for assigning hidden object presentation properties, illustrated in FIG. 2A, begins at 202. A user first attempts to open a file, step 204, in order to create a new presentation or modify an existing presentation. If the file is new, step 206, the new file is opened and processing continues at step 208. If the file is not new, step 206, method 200 determines the level of support provided for hidden objects, steps 220 through 228. A determination is made as to whether or not the application supports hidden objects, step 220. This determination can be made, for example, through the use of a new file type or file extension. If the application recognizes the file type, it has some level of support for hidden objects: the file is then opened at step 222, and processing continues at step 224. If the application does not recognize the new file type or extension, step 220, the file cannot be opened, step 226, an appropriate error message is returned, and processing terminates, 250. As an alternative to using a new file type or extension, existing file types may be modified to include one or more indicators, such as one or more flag bits, designating that a file is created, modified, or last saved using an application having support for hidden objects, and whether or not hidden objects are present in the file.

Once an existing file is opened, step 222, the level of hidden object support provided by the application is determined, step 224. For example, an application might provide full support for hidden objects, by providing multiple types of hidden object presentation properties and multiple values or levels of hidden object presentation properties. Alternatively, an application might provide reduced support for hidden objects, such as "binary" support where an object is designated either "hidden" or "not hidden" (i.e., always viewable). If the application provides full hidden field support, existing objects retain all preset property value(s), step 225, and processing continues at step 208. When full hidden object support is provided, new hidden objects are given the full hidden property capabilities of multiple hidden property values or levels. If the application provides binary support, existing objects will be characterized as either hidden or not hidden, step 228. Such binary objects are referred to herein as "simple" objects. All objects having at least one hidden object presentation property are designated "hidden" (hidden value 1 or on), including speaker notes. All other objects are designated not hidden, or always viewable (hidden value 0, or off). Once hidden values (on or off) are established for all objects, step 228, processing continues at step 208.

Upon opening a new file, or upon opening an existing file and determining that the application provides an acceptable level of support, objects are created or edited at step 208. Once an object is created or edited, step 208, a user determination is made regarding assignment of one or more hidden object presentation properties, step 210. As previously noted, assignment of one or more hidden object presentation properties designates an object as a hidden object, i.e., viewable under some but not all circumstances. If a user determination is made that the object is not a hidden object, processing continues at step 212. If a user determination is made that the object is a hidden object, hidden object presentation properties are assigned to the hidden object, step 230, and processing then continues at step 212. As described in detail herein, the options available for setting hidden object properties vary depending on the level of support (full or binary). If there are additional objects to create or edit, step 212, processing continues at step 208 where the next object is created or edited. If there are no additional objects to create or edit, step 212, processing continues at step 214, where the file is saved and closed. Processing then terminates, step 250.

Figure 2B:
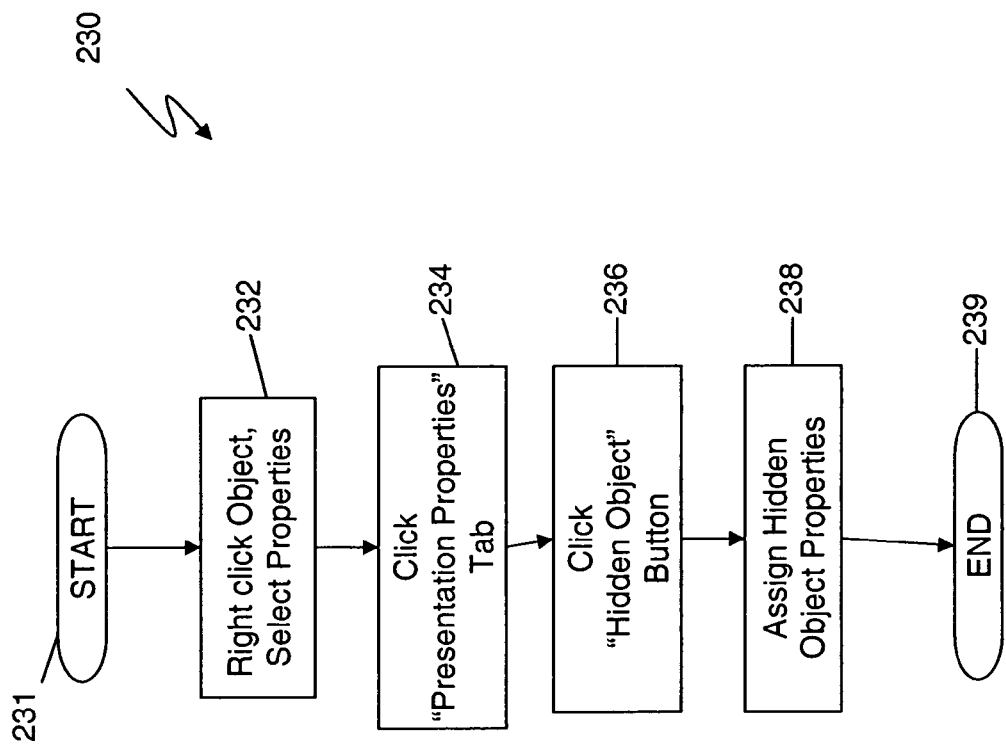
FIG. 2B illustrates an object presentation assignment method, per an embodiment of the present invention.
Figure 4A:
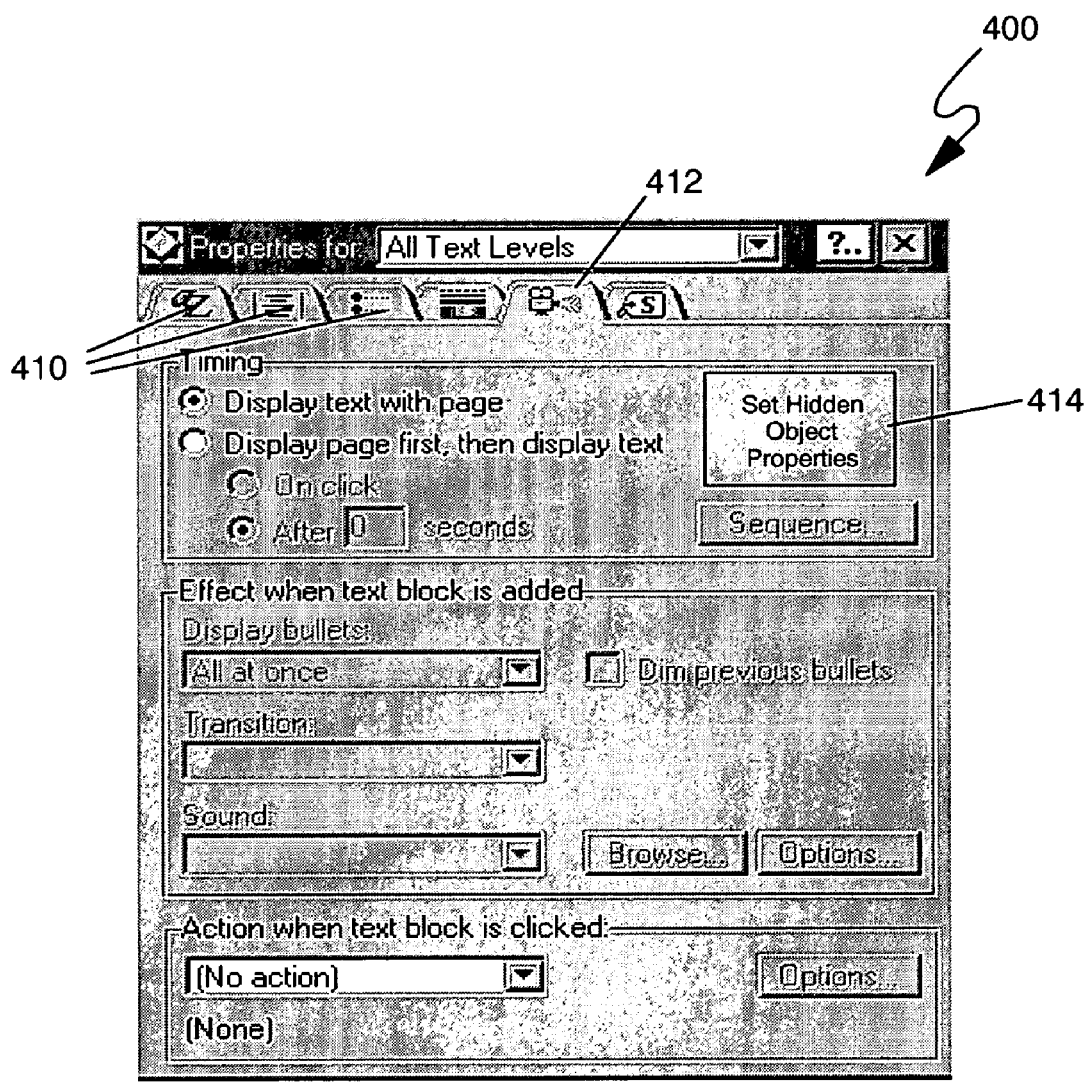
FIG. 4A illustrates an object properties dialog box, per an embodiment of the present invention.
Figure 4B:
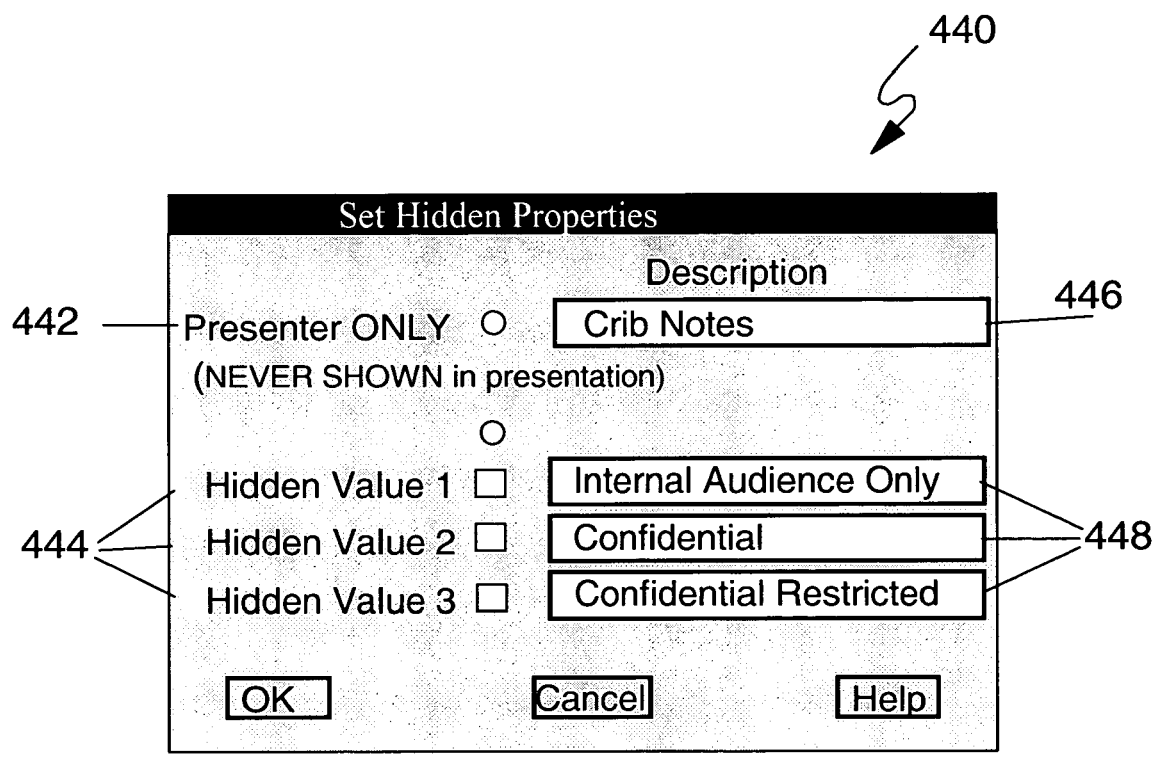
FIG. 4B illustrates a set hidden object properties dialog box, per an embodiment of the present invention.

With reference now to FIGS. 2B, 4A, and 4B, additional details of a hidden object presentation property assignment method of an embodiment of the present invention is disclosed. FIG. 2B discloses additional details of process 230, FIG. 2A. Upon a user determination that an object is a hidden object, hidden object presentation properties are assigned, process 230 of FIG. 2A. As illustrated in FIG. 2B, process 230 begins at step 232, where an object properties dialog is opened. In one embodiment of the present invention, an object properties dialog may be opened by right-clicking the hidden object, thereby opening an object menu, and selecting "properties" from the object menu. Alternatively, hidden object properties may be accessed by adding an item such as "Set Hidden Object Properties" directly to an existing menu, such as an object menu invoked by right-clicking on an object, or a menu item shown in a menu bar such as a Format menu. An example of a properties dialog per an embodiment of the present invention is illustrated in FIG. 4A, dialog box 400. A properties dialog of preferred embodiments of the present invention, such as dialog box 400 of FIG. 4A, includes multiple categories of properties, such as fonts, colors, alignment options, etc., each of which is represented by tabs 410 within the properties dialog. One such category of object properties, represented by tab 412, is "presentation properties," selected at step 234. As illustrated in FIG. 4A tab 412, a presentation properties tab may be identified by an icon, such as a projector or other presentation device. Embodiments of the present invention include "hidden object" properties as one sub-category of object presentation properties, selectable by clicking button 414 on the presentation properties tab, step 236.

In preferred embodiments of the present invention, hidden object properties are assigned, step 238, by using a Set Hidden Properties dialog box 440, as illustrated in FIG. 4B. Dialog box 440 is presented in response to user selection of hidden object properties button 414, at step 236. In the embodiment illustrated in FIG. 4B, dialog box 440 allows a user to select two types of hidden object presentation properties, as previously described: a presenter only property (442, 446), and a hidden object level property (444, 448). In preferred embodiments of the present invention, a user may select either type of hidden object presentation property, or both types may be used together for a single object. Alternative embodiments are envisioned wherein only one type of hidden object presentation property (presenter only, or object level) may be selected for any one object.

A user assigns the "presenter only" property to an object by selecting "presenter only" button 442. Preferred embodiments of the present invention provide comment field 446, associated with the "presenter only" property. A user enters a descriptive comment in field 446, such as "crib notes" or "speaker annotations," describing how the property is used in the current presentation file. Comments entered in field 446 are applied whenever dialog 440 is opened, changes in field 446 are applied to all objects within a presentation file. When a screenshow is presented using a platform providing support for multiple logical displays, such as a laptop computer 110, objects with which the "presenter only" property is associated are viewable only on logical displays associated with a display attribute of "presenter" or "show speaker notes" or the like.

In addition to the "presenter only" property, preferred embodiments of the present invention provide multiple hidden object property values. In one embodiment of the present invention having hierarchical hidden object property levels, a user assigns a hidden object level by selecting one hidden level from the available levels, 444. As previously discussed, when a hierarchical set of properties is used, lower level object properties indicate that an object is viewable by a wider range of audiences than higher level object properties. Preferred embodiments of the present invention further provide comment fields 448, where a user may enter text describing how each particular level is used in the current presentation file. As with comments 446, comments 448 are applied whenever dialog 440 is opened, changes in field 448 are applied to all objects within a presentation file. In the illustrative embodiment of FIG. 4B, for example, comment fields 448 indicate the security or privacy level of each hidden object property level. Level 1, for example, may be shown to internal audiences only. Level 2 includes information of a more sensitive or confidential nature, and is viewable by a subset of internal audiences. Finally, Level 3 includes information of a highly sensitive nature, and is viewable by a more restricted subset of internal audiences. In this illustrative embodiment, level 0 objects (i.e., always viewable or not hidden) are viewable by all audiences without restriction, whether internal or external.

When a screenshow is presented using a platform providing support for multiple logical displays, such as a laptop computer 110, one or more display attributes are associated with each logical display. The display attribute determines the hidden objects viewable on each logical display. For example, in embodiments using hierarchical hidden object properties, a display attribute of "level 0" allows no hidden objects to be displayed. A display attribute of "level 1" allows level 1 hidden objects to be displayed. A display attribute of "level 2" allows both level 2 and level 1 objects to be displayed, and a display attribute of "level 3" allows level 1, 2, and 3 objects to be displayed.

Alternative embodiments are envisioned where hidden object values 444 are individually selectable rather than hierarchical. Values may be mutually exclusive (i.e., only one value may be selected per object), or in the alternative any or all values may be selected in any combination. User-selectable options may be provided to determine whether hidden object values operate in a hierarchical, mutually exclusive, or combined manner.

Once appropriate hidden object properties are assigned, step 238, dialog box 440 is closed and process 230 terminates, step 239. Processing then continues with step 212 of FIG. 2A.

In alternative embodiments of the present invention providing only binary hidden object support, dialog box 440 may be greatly simplified or even entirely omitted. Since the hidden status of an object in such an embodiment is essentially a binary value or switch, a single selection is all that is required to set an object's hidden property. In such an embodiment, dialog box 440 need only contain one selection: HIDDEN. Alternatively, in binary support embodiments, object properties dialog 400 may be modified to include this single selection in place of "Set Hidden Object Properties" button 414. Other alternatives are envisioned, such as providing a selectable switch on an object menu accessed by right-clicking an object.

Preferred embodiments of the present invention further provide the ability to apply hidden object presentation properties to portions of objects, to collections of objects, or to groups of objects, all within the spirit and scope of the present invention. As used herein, a collection of objects (or object collection) consists of a plurality of objects temporarily selected for the same action or actions. A group of objects (or object group) consists of a plurality of associated objects, such that the association persists until specifically terminated by a user action.

In some circumstances, it may be desirable to create a single object, such as a text object, and apply different hidden object presentation properties to different portions of the text object. In preferred embodiments of the present invention, hidden object properties may be assigned to a portion of a text object by selecting a portion of the text object, step 208, then performing steps 232 through 238 on the selected object portion. Object collections are handled in a similar manner: multiple objects are first selected, step 208, then steps 232 through 238 are performed on the object collection. Existing object groups are also handled similarly: an object group is first selected, step 208, then steps 232 through 238 are performed on the object group.

Preferred embodiments of the present invention include methods to resolve conflicts during object group creation, and to restore the hidden object properties of individual objects when a group is terminated (or ungrouped). An object group is formed by selecting a plurality of existing objects, then selecting an action to group the objects into a compound object or object group. The individual objects may or may not share the same hidden object presentation properties. If all of the individual objects share the same hidden object presentation properties, the newly formed object group is assigned these common hidden object presentation properties. If, however, the individual objects do not share the same hidden object presentation properties, property conflicts are resolved by assigning a default set of properties to the newly created group. In preferred embodiments of the present invention, the newly created group is always shown: using the preceding examples of FIG. 4B, neither presenter-only button 442 or any hidden property level buttons 444 are selected for the new group. Default group properties may be modified as previously described. Each individual object within the new group retains its hidden object properties, however these properties are overridden by the group property. If the group is subsequently terminated or ungrouped, thereby restoring the individual objects, the retained hidden object properties of each individual object are restored.

As previously noted, objects may be associated with a presentation page either by being placed on or within the page, or by other means such as by being placed in a window or screen region outside of the presentation page. Speaker notes are an example of an object associated with a presentation page and typically located in a window or screen region outside of the presentation page. The methods of the present invention are applicable to objects such as speaker notes that are associated with a page but not placed within the page. Once such an object is selected, or alternatively once a portion of such an object is selected, hidden object presentation properties are assignable to the selected object (or selected portion) as previously discussed with reference to FIGS. 2A and 2B.

Figure 3:
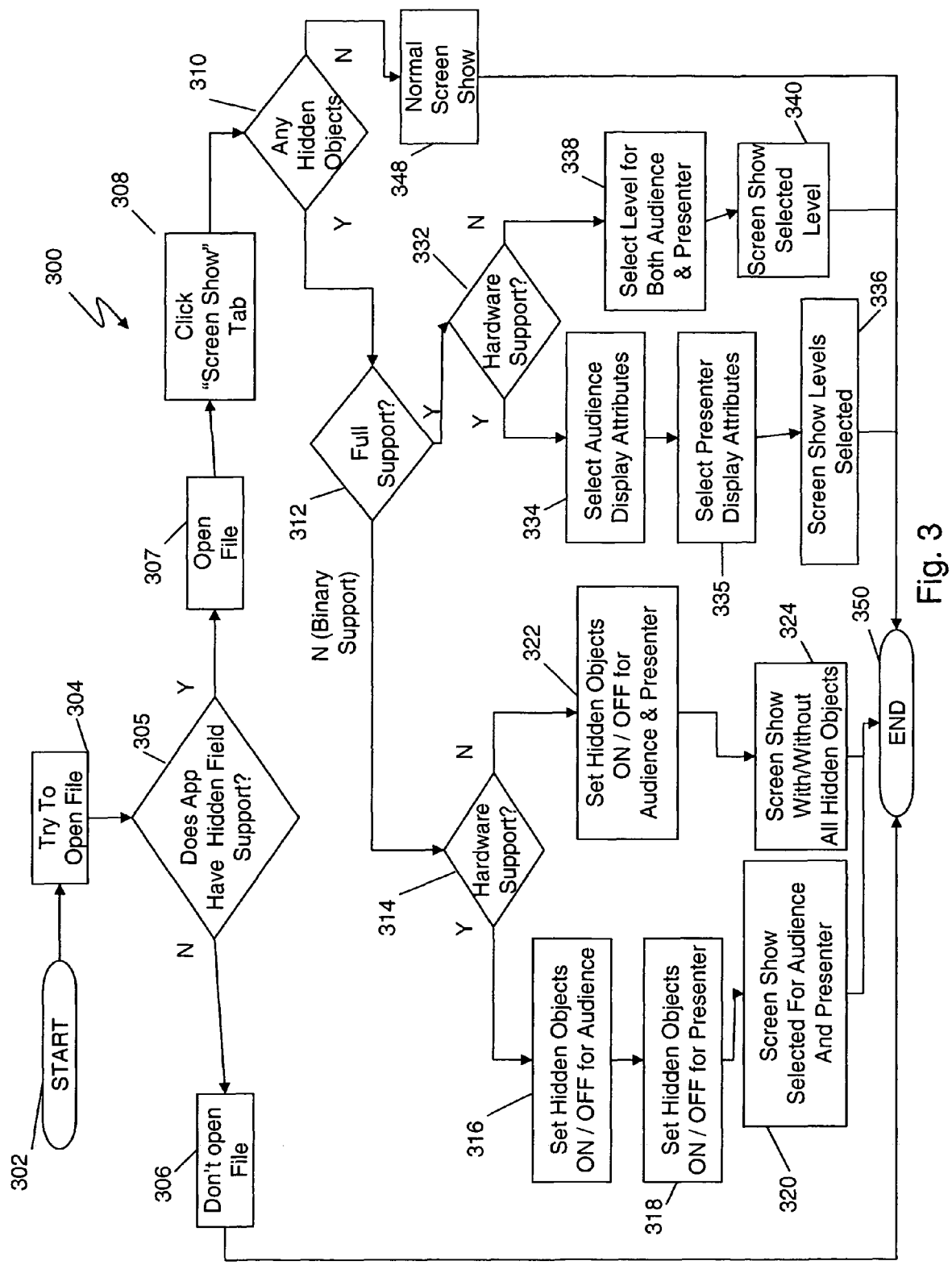
FIG. 3 illustrates a method of performing a setup operation for a computer-driven presentation, per an embodiment of the present invention.

FIG. 3 illustrates one embodiment of a method for setting up a computer driven presentation, such that appropriate objects are displayed during the presentation. As previously discussed with reference to FIG. 2, preferred embodiments of the present invention provide a method of assigning one or more hidden object presentation properties to objects, portions of objects, collections of objects, and groups of objects. During screenshow setup, attributes are assigned to the logical displays to be used to deliver the screenshow. These attributes determine the objects viewable on each logical display. For example, in preferred embodiments of the present invention, one type of attribute capable of being associated with a presenter logical display is an attribute indicating that crib notes or annotation objects are to be shown on the presenter logical display. Also for example, in preferred embodiments of the present invention, an attribute capable of being associated with any logical display is an attribute indicating the value or level of hidden objects to be shown on the display. Embodiments are envisioned where this attribute is independently selected for each logical display, or alternatively, where this attribute is selected for and applied to all logical displays. Furthermore, this display attribute is also advantageously utilized in environments having only one logical display. Preferred embodiments of the present invention provide a user the ability to select whether the same hidden object value attribute is necessarily associated with all logical displays, or whether a hidden object value attribute is individually selectable for each logical display.

Method 300 of FIG. 3 begins by attempting to open a presentation file, step 304. A determination is made, step 305, whether the application provides hidden object presentation property support. This determination can be made, for example, through the use of a new file type or file extension. If the application recognizes the file type, it has some level of support for hidden objects: the file is then opened at step 307, and processing continues at step 308. If the application does not recognize the new file type or extension, step 305, the file cannot be opened, step 306, an appropriate error message is returned, and processing terminates, 350. As an alternative to using a new file type or extension, existing file types may be modified to include one or more indicators, such as one or more flag bits, designating that a file is created, modified, or last saved using an application having support for hidden objects, and whether or not hidden objects are present in the file.

If the application supports hidden objects, the file is opened at step 307. Processing continues at step 308, user selection of screenshow or slideshow setup. The open file is next examined to determine if it includes hidden objects, step 310. If the open file does not contain hidden objects, processing continues at step 348, providing a standard screen show or slide show as known in the art. If the open file contains hidden objects, step 310, processing continues at step 312, where a determination is made regarding the level of hidden object support provided by the application (i.e., full or binary support). If the application provides full support, step 312, processing continues at step 332 where a determination is made regarding the level of support for multiple logical displays provided by the operating system and hardware. This determination is made, for example, by using operating system routines to query the video controller(s) 150 present in system 110, to determine whether or not multiple monitor support is available. If multiple logical display support is available, processing continues at step 334, where one or more display attributes are assigned to the audience display(s), such as a hidden object level attribute, thereby determining the objects viewable on the audience display during a screenshow or slideshow. Processing then continues at step 335, where one or more presentation attributes are assigned to the presenter display. As noted above, attributes such as hidden object level and display annotations may be assigned to a presenter logical display, thereby determining the objects viewable on the presenter display during a screenshow or slideshow. A screenshow or slideshow is then presented, step 336, where appropriate objects are displayed on the audience display and the presenter display based upon the display attribute selections made in steps 334 and 335.

If full hardware support for multiple logical monitors is not provided, step 332, one hidden object level is selected and assigned to the single logical display, step 338. This level is viewed by both audience and presenter. Processing then continues at step 340, where the selected level is displayed. Thus, the hidden object level property aspect of the present invention may be advantageously utilized without hardware support for multiple logical monitors.

Figure 4C:
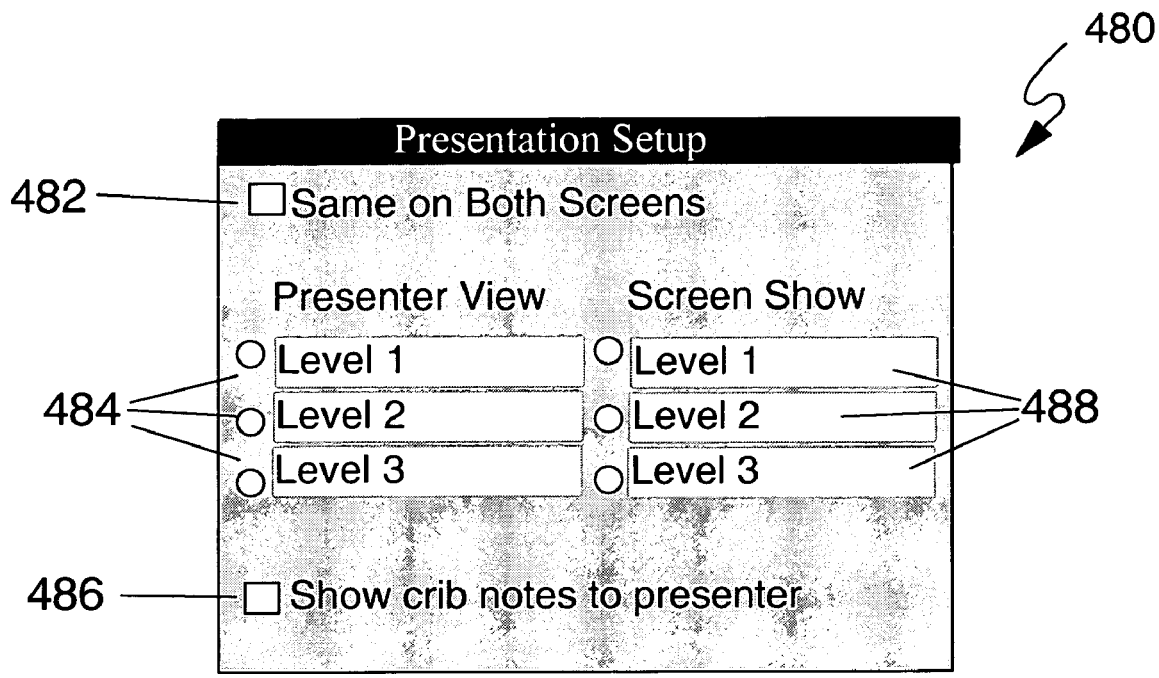
FIG. 4C illustrates a presentation setup dialog box, per an embodiment of the present invention.

FIG. 4C illustrates one embodiment of a dialog box 480 useful in assigning attributes to logical displays, steps 334, 335, and 338. Dialog box 480 includes: display synchronization button 482; hidden object level attribute selection buttons for a presenter logical display, 484, and for an audience logical display, 488; and a show annotations attribute for a presenter logical display, 486. During steps 334 and 335, where full software support for multiple levels of hidden object properties and hardware support for multiple logical displays is available, dialog box 480 provides a user with the widest range of options. A user may select display synchronization button 482, thereby assigning the same hidden object level attribute(s) to both logical displays, and therefore causing both logical displays to present the same level of hidden objects. In response to user selection of button 482, one set of object level attribute selection buttons 484 and 488 is "grayed-out," thereby preventing a user from making a conflicting selection. In preferred embodiments of the present invention, when button 482 is selected, object level attribute selection buttons 488 (audience display) are grayed-out, and hidden object level attribute selection is performed using presenter buttons 484. Alternative embodiments are envisioned where the presenter view buttons 484 are grayed out, and the object level attribute selection is performed using buttons 488. If synchronization button 482 is not selected, hidden object level attribute buttons 484 and 488 are independently selectable, allowing a user to select one level of hidden objects for display on a presenter logical display, and a different level of hidden objects for display on an audience logical display. In preferred embodiments of the present invention, the audience level selection (488) defaults to the same level selected for the presenter display (484), however the default level selection in 488 may be overridden by a user, simply by selecting some other level in 488. Finally, during step 335 show annotations button 486 is selectable whether or not button 482 is selected. By selecting button 486, objects associated with the "presenter only" property are displayed on the presenter logical display.

During step 338, dialog box 480 presents fewer user-selectable options, since hardware support for multiple logical displays is unavailable. During step 338, synchronization button 482 is both selected and grayed-out: since only one logical display is supported, a user is prevented from selecting different hidden object level attributes for different physical displays. As before, one set of object level attribute selection buttons 484 and 488 is grayed out, preferred embodiments gray out buttons 488. Finally, show annotations button 486 is also grayed out, since only one logical display is supported.

As previously noted, a presentation graphics application might provide partial support for hidden object properties, rather than providing multiple levels of hidden object properties. For example, rather than supporting multiple levels of hidden object properties as in preferred embodiments of the present invention, an application might provide binary hidden object properties: all objects are either hidden or always viewable. If the open file includes hidden objects, step 310, a determination is next made whether the application provides full hidden object support or partial (i.e., binary) hidden object support, step 312. If the application provides binary hidden object property support, processing continues at step 314, where a determination is made regarding the level of support for multiple logical displays provided by the operating system and hardware. This determination is made in a manner similar to that of step 332, for example, by using operating system routines to query the video controller(s) 150 present in system 110, to determine whether or not multiple monitor support is available. If multiple logical display support is available, processing continues at steps 316 and 318, where hidden objects are turned ON or OFF for the presenter display, step 316, and hidden objects are turned ON or OFF for the audience display, step 318. A screenshow or slideshow is then presented, step 320, where appropriate objects are displayed on the audience display and the presenter display based upon the user selections made during steps 316 and 318. If full hardware support for multiple logical monitors is not provided, step 314, hidden objects are turned ON or OFF for the single logical display, step 322. The presentation is then displayed in accordance with the user selection of step 322, at step 324. Processing then terminates, step 350.

Figure 4D:
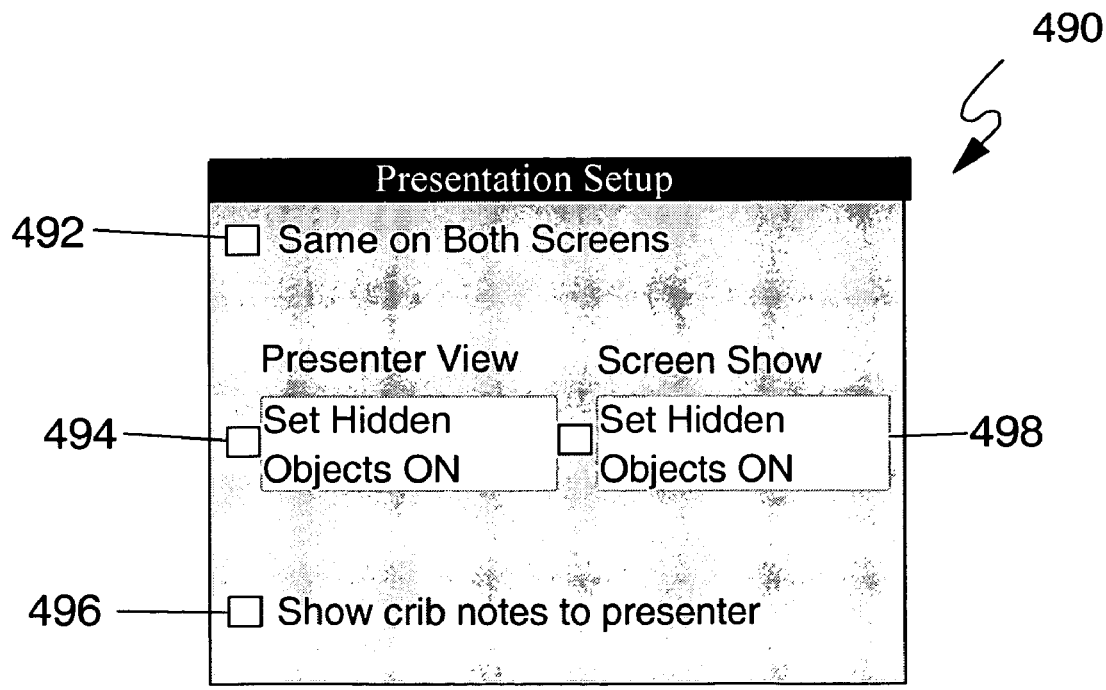
FIG. 4D illustrates a dialog box for assigning attributes to logical displays.

FIG. 4D illustrates an embodiment of a dialog box 490 useful in assigning attributes to logical displays, steps 316 and 322. Dialog box 490 includes: display synchronization button 492; hidden object attribute switches for a presenter logical display, 494, and for an audience logical display, 498.

During steps 316 and 318, only binary support for hidden objects is available: dialog 490 therefore presents fewer options than dialog 480. A user may select display synchronization button 492, thereby causing both logical displays to present the same level of hidden objects. In response to user selection of button 492, one of object attribute switches 494 and 498 is "grayed-out," thereby preventing a user from making a conflicting selection. In preferred embodiments of the present invention, when button 492 is selected, object attribute switch 498 (audience display) is grayed-out, and hidden object ON/OFF selection is performed using presenter switch 494. Alternative embodiments are envisioned where the presenter view switch 494 is grayed out, and the hidden object ON/OFF attribute selection is performed using switch 498. If synchronization button 492 is not selected, hidden object ON/OFF attribute switches 494 and 498 are independently selectable, allowing a user to turn all hidden objects ON for one logical display and OFF for another logical display.

During step 322, dialog box 490 presents fewer user-selectable options, since hardware support for multiple logical displays is unavailable. During step 322, synchronization button 492 is both selected and grayed-out: since only one logical display is supported, a user is prevented from selecting different values for switches 494 and 498. As before, one of switches 494 and 498 is grayed out, preferred embodiments gray out buttons 498.

Figure 5:
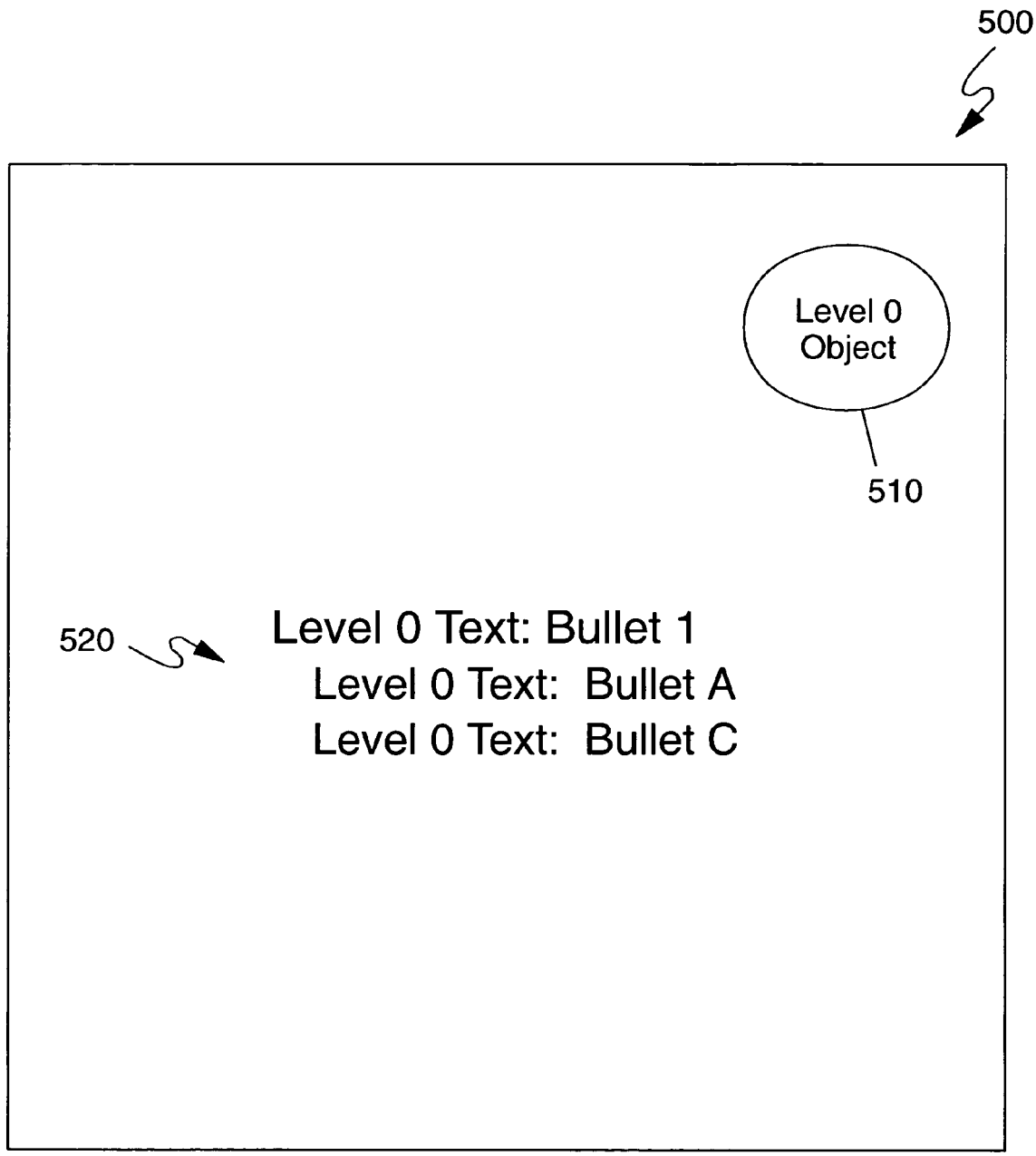
FIG. 5 illustrates a sample presentation page viewable by all audiences, per an embodiment of the present invention.

By way of illustrative example, FIGS. 5 through 7 depict sample presentation pages viewable under various circumstances, utilizing various features of the present invention. In particular, the illustrative example of FIGS. 5 through 7 utilizes at least two levels of hierarchical hidden object presentation property levels, and speaker annotation objects (text and graphics). All views presented in FIGS. 5 through 7 represent a single presentation page within a presentation graphics application file, where hidden object properties are assigned to objects within the single presentation page. The various views depicted in FIGS. 5 through 7, as described below, represent various views of the single presentation page created by selecting various sets of display attributes during screenshow setup. Thus, the various views of the single presentation page represented by FIGS. 5 through 7 are displayable without requiring modifications to the single presentation page or the objects contained therein.

FIG. 5 depicts a presentation view suitable for all audiences, per an embodiment of the present invention. View 500 includes two objects: a graphic object 510 and a text object 520. Both objects 510 and 520 are "level 0" objects, to which no hidden object properties are assigned. As previously noted, in embodiments of the present invention utilizing hierarchical hidden object property levels, objects that are always viewable (or objects that are not "hidden") are designated "level 0" objects, and are shown on all displays without regard to the set of display attributes selected for the display. FIG. 5 represents a presentation view shown on a display to which no display attributes are assigned (see FIG. 4C), therefore only level 0 objects are displayed in the presentation view as depicted in FIG. 5.

Figure 6A:
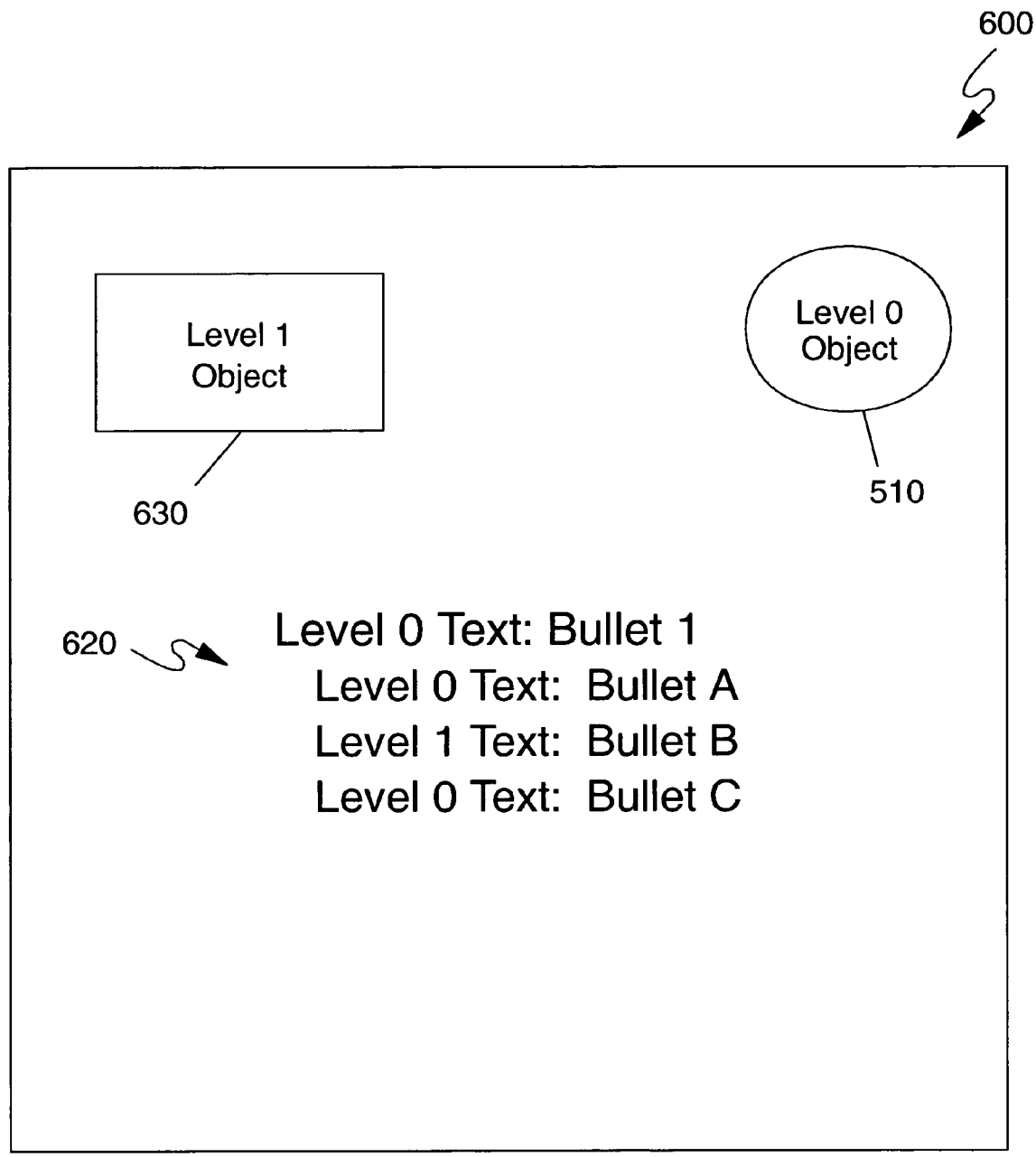
FIGS. 6 illustrate sample presentations pages viewable by restricted audiences, per an embodiment of the present invention.

FIG. 6A depicts a presentation view suitable for a restricted audience, per an embodiment of the present invention. In particular, FIG. 6A depicts a presentation viewable on a display to which display attributes such as "level 1," and "screen show" are assigned (see FIG. 4C). Object 510 and text 520, both level 0 objects and therefore always viewable, are displayed. In addition, a level 1 graphic object 630 is displayed. Object 630 represents an object to which a "level 1" or "hidden value 1" hidden object presentation property is assigned (see FIG. 4B). Furthermore, text object 520 is augmented by the addition of level 1 text: the augmented text object appears as object 620. As previously noted, hidden object presentation properties are assignable to entire objects, portions of objects, collections of objects, and groups of objects. Thus, a text object may include one or more portions that are always viewable (level 0), and may also include one or more portions to which a hidden object property level are assigned, such as the "Level 1 Text: Bullet B" portion of object 620, to which a level 1 hidden object property is assigned. Such an effect is created using the teachings of the present invention by first creating a text object including all text shown in object 620, selecting a portion of the created text object (such as "Level 1 Text: Bullet B"), and assigning a hidden object property to the selected portion. In preferred embodiments of the present invention, selecting a carriage return/line feed (CRLF) character in addition to text, and assigning a hidden object property to the selected text plus CRLF, prevents both the selected text and a blank line from being viewed on displays to which lower level display attributes are assigned. For example, text object 520 does not include a blank line between "Bullet A" and "Bullet C," however text object 620 includes "Bullet B" located between "Bullet A" and "Bullet C."

Figure 6B:
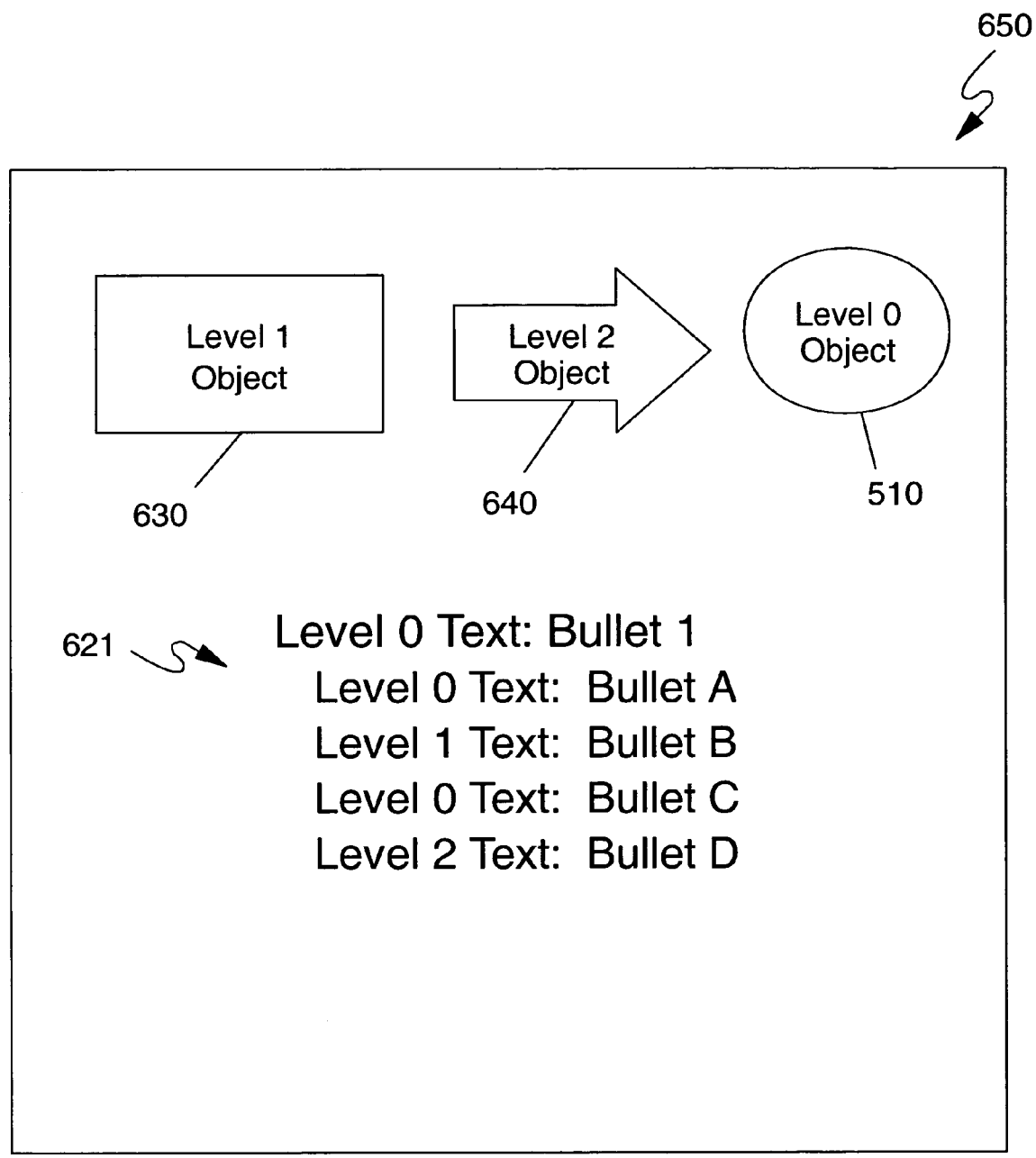

FIG. 6B depicts a presentation view suitable for a further restricted audience, per an embodiment of the present invention. In particular, FIG. 6B depicts a presentation viewable on a display to which display attributes such as "level 2," and "screen show" are assigned (see FIG. 4C). Since the illustrative example uses hierarchical hidden object property levels, all objects viewable on a display to which a "level 1" attribute are assigned (such as the view depicted in FIG. 6A) are also viewable on a display to which a "level 2" attribute are assigned. Objects 510, 630, and all text contained within text object 620 are therefore viewable. In addition, a level 2 graphic object, 640, is viewable: this object is not shown on displays to which lower level attributes (level 1, or no display attribute) are assigned. Similarly, text object 620 is further augmented by the addition of level 2 text: the augmented object is shown as text object 621. Thus, the combined effect of objects 520, 620, and 621, depicted in FIGS. 5, 6A, and 6B, respectively, is created using the teachings of the present invention by first creating a text object including all text shown in object 621, selecting "Level 1 Text: Bullet B" plus CRLF, assigning a level 1 hidden object property to this selected portion, then selecting "Level 2 Text: Bullet D: plus CRLF, and assigning a level 2 hidden object property to this selected portion.

Figure 7A:
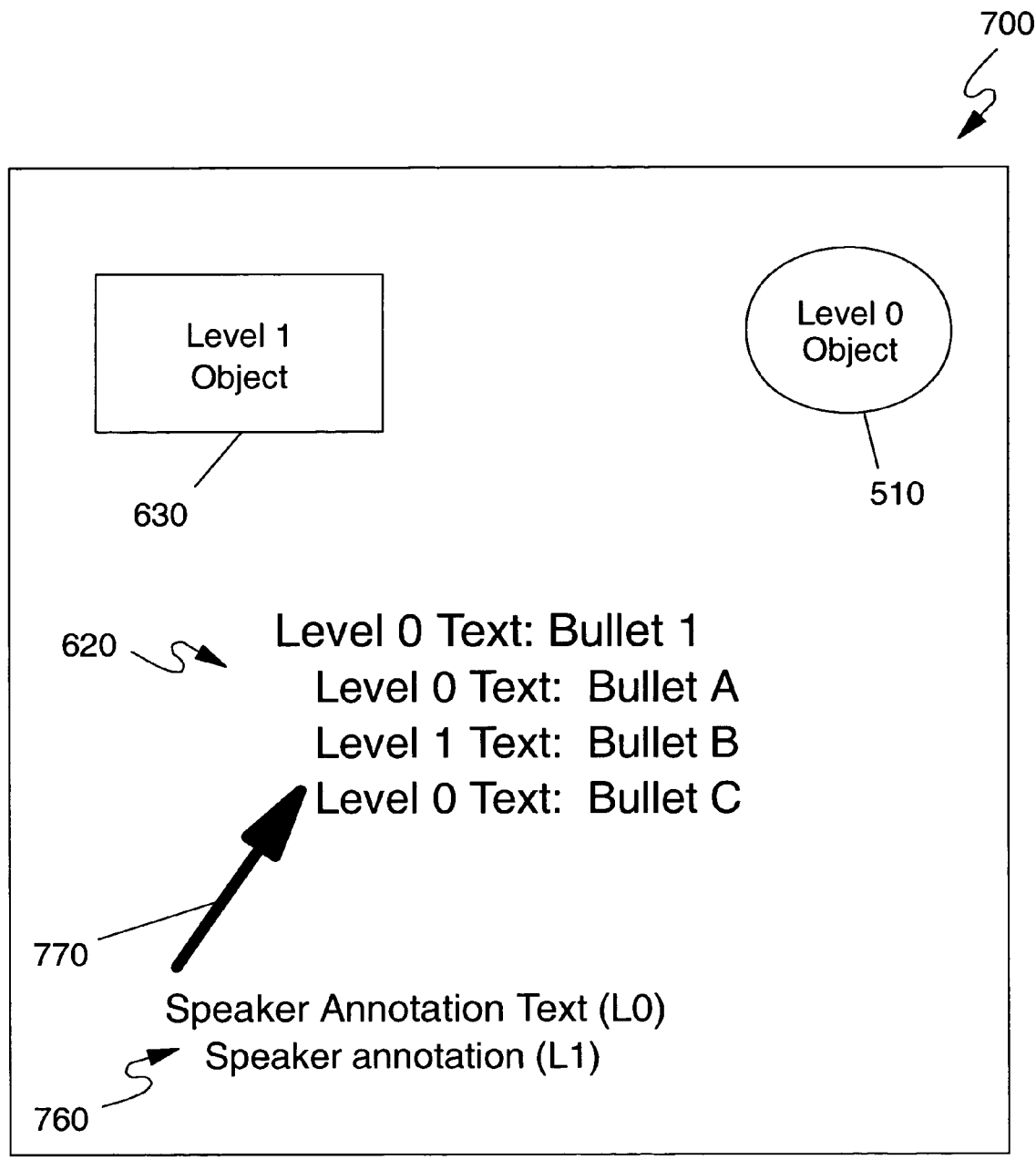
FIGS. 7 illustrate sample presentation pages including speaker annotations, per an embodiment of the present invention.

FIG. 7A depicts a presentation view suitable for a presenter during a screenshow to a restricted audience, per an embodiment of the present invention. In particular, FIG. 7A depicts a view shown on a display to which display attributes such as "level 1" and "presenter" are assigned (see FIG. 4C). All objects viewable on a display to which "level 1" and "screenshow" attributes are assigned are also shown on a display assigned "level 1" and "presenter" attributes: the "level 1" presenter views all objects shown to the "level 1" audience. FIG. 7A therefore depicts all objects shown in FIG. 6A: level 0 object 510, level 1 object 630, and text object 620 (containing both level 0 and level 1 portions). In addition, FIG. 7A depicts two objects intended for viewing by a presenter (but not the audience): text object 760, and graphic object 770. As illustrated, text object 760 includes a level 0 portion ("Speaker Annotation Text (L0)") and a level 1 portion ("Speaker annotation (L1)"). As depicted in FIG. 7A, graphic object 770 is a level 0 object. Thus, all objects assigned hidden object property levels "0" or "1" are shown on a display assigned "level 1" and "presenter" attributes.

Figure 7B:
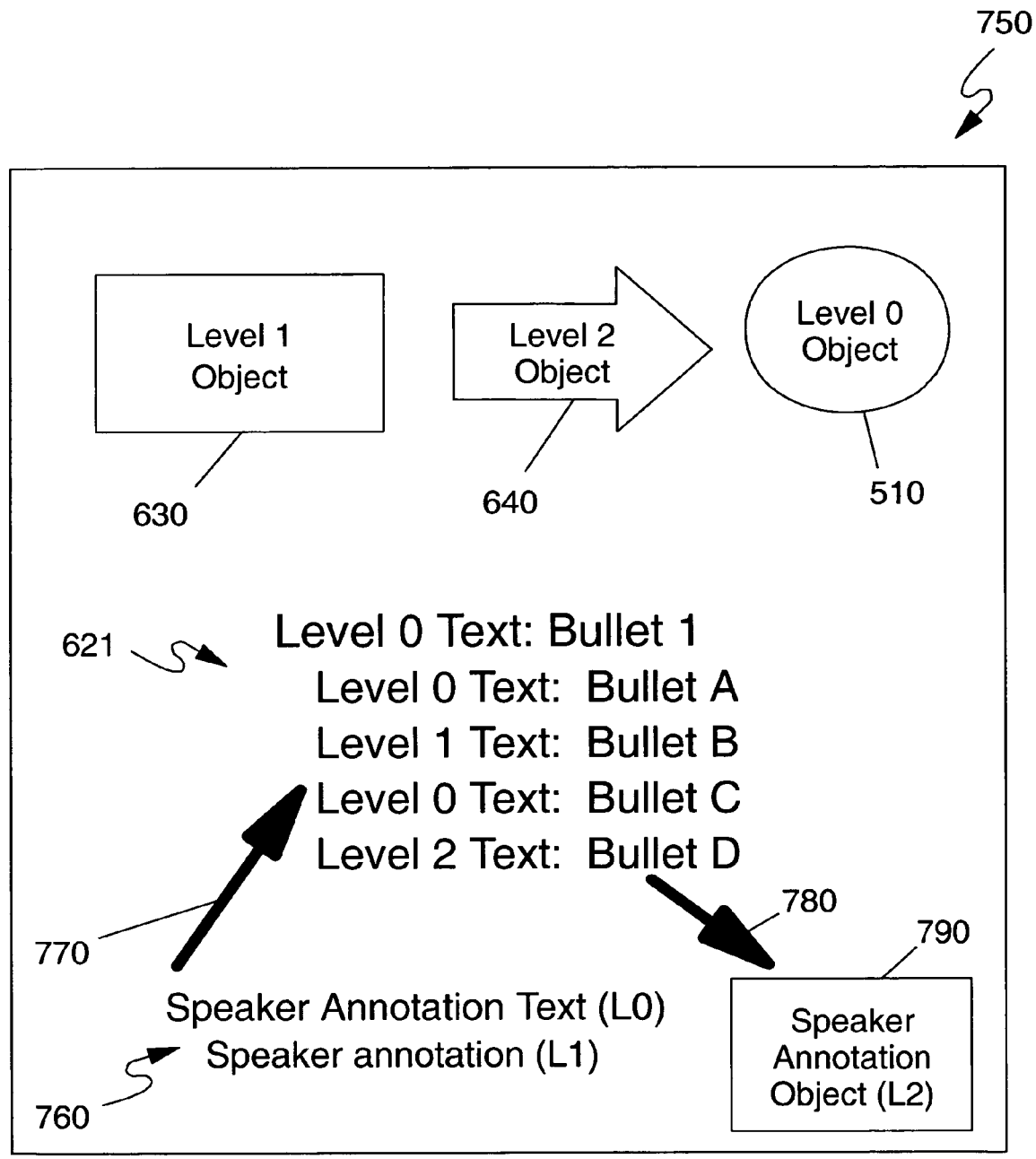

FIG. 7B depicts a presentation view suitable for a presenter during a screenshow to a further restricted audience, per an embodiment of the present invention. In particular, FIG. 7B depicts a view shown on a display to which display attributes such as "level 2" and "presenter" are assigned (see FIG. 4C). All objects viewable on a display to which "level 2" and "screenshow" attributes are assigned are also shown on a display assigned "level 2" and "presenter" attributes: the "level 2" presenter views all objects shown to the "level 2" audience. FIG. 7B therefore depicts all objects shown in FIG. 6B: level 0 object 510, level 1 object 630, level 2 object 640, and text object 620 (containing level 0, level 2, and level 2 portions). Similarly, all objects viewable on a display to which "level 1" and "presenter" attributes are assigned are also shown on a display assigned "level 2" and "presenter" attributes: the "level 2" presenter views all objects shown to a "level 1" presenter. In addition, FIG. 7B depicts two objects intended for viewing by a "level 2" presenter (but not the audience, and not a level 1 presenter): objects 780 and 790.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling content displayed during a computer-driven presentation on a plurality of logical displays attached to a computer system and controlled by a presentation graphics application running on said computer system, the method being performed by the presentation graphics application and comprising:

associating a user-selectable hidden object presentation property with a selected object within a presentation page, said hidden object presentation property indicating a display attribute for which the selected object is presented during said computer-driven presentation;

assigning a user-selectable display attribute to each of said plurality of logical displays, said display attribute indicating hidden object presentation properties of objects within presentation pages to be presented on such logical display during the computer-driven presentation; and presenting, on each of said plurality of logical displays, objects associated with hidden object presentation properties indicated by the display attribute assigned to that logical display while inhibiting presentation of other objects on that logical display.

2. The method of claim 1, wherein said at least one hidden object presentation property includes a property designating an object as visible only to a presenter.

3. The method of claim 1, wherein said at least one hidden object presentation property includes a property designating an object as visible to an audience meeting a criteria.

4. The method of claim 3, wherein said criteria is an indicator selected from the group consisting of security clearance and privacy level.

5. The method of claim 1, wherein said associating includes associating a plurality of hidden object presentation properties with said selected object.

6. The method of claim 5, wherein at least one of said plurality of hidden object presentation properties is only associated with a portion of said selected object.

7. The method of claim 1, further comprising grouping a set of objects into a compound object.

8. The method of claim 7, wherein said providing and said associating are performed on the compound object.

9. The method of claim 8, further comprising retaining hidden object presentation properties associated with individual objects within the set of objects.

10. The method of claim 9, wherein hidden object presentation properties associated with the compound object take precedence over retained hidden object presentation properties associated with individual objects within the set of objects grouped into the compound object.

11. The method of claim 9, further comprising:
ungrouping said compound object; and
restoring retained hidden object presentation properties for all objects ungrouped from the compound object.

12. The method of claim 1, wherein said providing includes presenting a dialog box, the dialog box including all valid hidden object presentation properties for the selected object.

13. The method of claim 1, wherein said at least one display attribute includes an attribute indicating that objects viewable only by a presenter are to be displayed.

14. The method of claim 1, wherein said at least one display attribute includes an attribute indicating that objects viewable by an audience meeting a criterion are to be displayed.

15. The method of claim 14, wherein said criterion is an indicator selected from the group consisting of security clearance and privacy level.

16. The method of claim 1, wherein one of said plurality of logical displays is a portable computing device display screen.

17. The method of claim 16, wherein another of said plurality of logical displays is selected from the group consisting of an external monitor, a projector, and a television monitor.

18. At least one program storage device readable by a machine, embodying at least one program of instructions executable by the machine to perform a method for controlling content displayed during a computer-driven presentation on a plurality of logical displays attached to a computer system and controlled by a presentation graphics application running on said computer system, the method being performed by the presentation graphics application and comprising:

associating a user-selectable hidden object presentation property with a selected object within a presentation page, said hidden object presentation property indicating a display attribute for which the selected object is presented during said computer-driven presentation;

assigning a user-selectable display attribute to each of said plurality of logical displays, said display attribute indicating hidden object presentation properties of objects within presentation pages to be presented on such logical display during the computer-driven presentation; and presenting, on each of said plurality of logical displays, objects associated with hidden object presentation properties indicated by the display attribute assigned to that logical display while inhibiting presentation of other objects on that logical display.

19. The at least one program storage device of claim 18, wherein said at least one hidden object presentation property includes a property designating an object as visible only to a presenter.

20. The at least one program storage device of claim 18, wherein said at least one hidden object presentation property includes a property designating an object as visible to an audience meeting a criteria.

21. The at least one program storage device of claim 20, wherein said criteria is an indicator selected from the group consisting of security clearance and privacy level.

22. The at least one program storage device of claim 18, wherein said associating includes associating a plurality of hidden object presentation properties with said selected object.

23. The at least one program storage device of claim 22, wherein at least one of said plurality of hidden object presentation properties is only associated with a portion of said selected object.

24. The at least one program storage device of claim 18, further comprising grouping a set of objects into a compound object.

25. The at least one program storage device of claim 24, wherein said providing and said associating are performed on the compound object.

26. The at least one program storage device of claim 25, further comprising retaining hidden object presentation properties associated with individual objects within the set of objects.

27. The at least one program storage device of claim 26, wherein hidden object presentation properties associated with the compound object take precedence over retained hidden object presentation properties associated with individual objects within the set of objects grouped into the compound object.

28. The at least one program storage device of claim 26, further comprising:

ungrouping said compound object; and restoring retained hidden object presentation properties for all objects ungrouped from the compound object.

29. The at least one program storage device of claim 18, wherein said providing includes presenting a dialog box, the dialog box including all valid hidden object presentation properties for the selected object.

30. The at least one program storage device of claim 18, wherein said at least one display attribute includes an attribute indicating that objects viewable only by a presenter are to be displayed.

31. The at least one program storage device of claim 18, wherein said at least one display attribute includes an attribute indicating that objects viewable by an audience meeting a criterion are to be displayed.

32. The at least one program storage device of claim 31, wherein said criterion is an indicator selected from the group consisting of security clearance and privacy level.

33. The at least one program storage device of claim 18, wherein one of said plurality of logical displays is a portable computing device display screen.

34. The at least one program storage device of claim 33, wherein another of said plurality of logical displays is selected from the group consisting of an external monitor, a projector, and a television monitor.

35. A system for controlling content displayed during a computer-driven presentation on a plurality of logical displays attached to a computer system and controlled by a presentation graphics application running on said computer system, the apparatus being instantiated by the presentation graphics application running on said computer system and comprising:

means for associating a user-selectable hidden object presentation property with a selected object within a presentation page, said hidden object presentation property indicating a display attribute for which the selected object is presented during said computer-driven presentation;

means for assigning a user-selectable display attribute to each of said plurality of logical displays, said display attribute indicating hidden object presentation properties of objects within presentation pages to be presented on such logical display during the computer-driven presentation; and means for presenting, on each of said plurality of logical displays, objects associated with hidden object presentation properties indicated by the display attribute assigned to that logical display while inhibiting presentation of other objects on that logical display.

* * * * *